A. D. CHASE.
Screen to be used in Drying Vegetables, &c.
No. 221,445.  Patented Nov. 11, 1879.
Fig. 1.
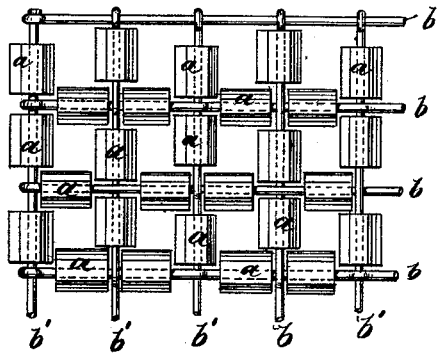
Fig. 2.
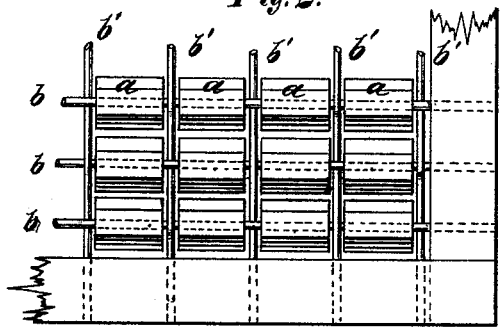
Fig. 3.  Fig. 5.
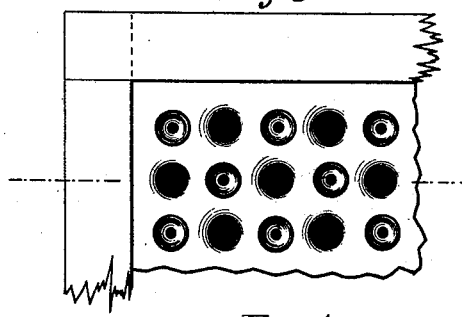 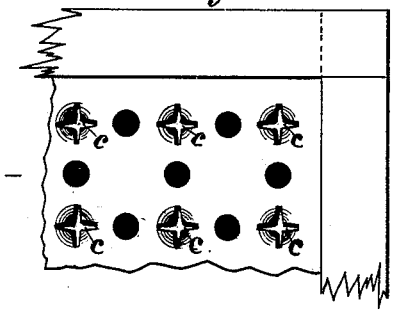
Fig. 4.
Witnesses:
Henry Eidling
B. S. Clark
Inventor:
Albert D. Chase
By J. L. Fitch
his atty

UNITED STATES PATENT OFFICE.

ALBERT D. CHASE, OF SEA CLIFF, NEW YORK.

IMPROVEMENT IN SCREENS TO BE USED IN DRYING VEGETABLES, &c.

Specification forming part of Letters Patent No. 221,445, dated November 11, 1879; application filed April 15, 1879.

*To all whom it may concern:*

Be it known that I, ALBERT D. CHASE, of Sea Cliff, Queens county, New York, have invented an Improved Screen or Tray to be used in Drying Vegetable or Animal Substances, of which the following is a specification, reference being had to the accompanying drawings, forming part of the same.

Figure 1 is a face representation of a portion of a screen or tray embodying my invention, and Fig. 2 is a modification of the same. Figs. 3, 4, and 5 show still another modification, particularly described hereinafter.

The trays formed of interwoven metallic wire or wire-cloth, or of perforated plates, usually employed, on which to lay vegetable or animal substances when submitting them to the action of heat or currents of air in the process of desiccation, are objectionable on account of the corrosive action thereon of acids or juices of the articles laid upon them, whereby the wire or plate is gradually destroyed, and the desiccating substances are stained or discolored. The substances are also greatly liable to be scorched or burned in consequence of the high heat-conducting power of the metallic wire. Even trays made of strips or rods of wood, such as rattan or willow interwoven, are objectionable, by reason of the destructive action of the juices of the drying articles upon them, and also from the articles sticking to the tray.

The object of my invention is to obviate the above-named objections; and it consists in combining glass or porcelain with the wire or rods or the plate forming the tray, so that the article to be dried thereon shall come in contact only with the glass or porcelain.

My method of combining the glass or porcelain with the body of the tray I will proceed to describe.

A tray designed for the purpose indicated, while it must be of light weight for convenience of handling, must also have sufficient strength to endure the rough usage to which it will be subjected and sustain the weight upon it, while at the same time air is permitted to pass freely through it. It is therefore usually made of interwoven rods of metal or wood, or thin perforated metallic plates.

In order to combine glass or porcelain with the body of such a tray I form it into small masses, and secure a large number of them to the tray with suitable spaces intervening between them. When interwoven wires or rods are employed I form the glass or porcelain into short cylinders or beads and string them upon the wire or rods, as shown in Fig. 1, in which $b$ and $b'$ indicate the interwoven wire, and $a$ indicates short glass cylinders strung on the wires between their crossings; or they may be placed only on one set of the wires, as shown in Fig. 2.

If a perforated plate is employed, short tubes or cylinders may be placed in the perforations, formed with a flange at the upper end and the middle of the shaft somewhat smaller in diameter than at the ends. When thus formed, and the perforation in the plate is made with a suitable somewhat tapering punch, so as to form a burr on the upper side, as seen in Fig. 4, (which is a section of such a perforated plate,) by forcing a cylinder into the perforation, and then closing back the metal around it, the latter will be securely retained in place. The air will pass freely up through the tubes, and their upper ends will present a sufficiently continuous glass or porcelain surface for the articles to be placed upon to dry.

Fig. 3 represents a face view of a section of a tray formed of sheet metal with perforations, every alternate perforation having in it one of the glass tubes before described; and Fig. 4 is a cross-section of the same, showing the glass or porcelain cylinders in place in the perforations; and Fig. 5 is a similar view of the metal sheet, showing how the perforations indicated by the letter $c$ may be made for holding the glass tubes.

In place of punching a hole in the metal a cross-cut is made and the points at the crossing of the cut, as shown in said figure, are bent down, forming an opening large enough for the admission of the end $d$, Fig. 4, of the tube. Then, when the tube is inserted the said points are bent back around the smaller diameter of the center of the tube, as seen in Fig. 4.

Another modification of the tray may consist of strips of sheet metal, bent longitudinally into a U form, with strips of glass or porcelain placed and held between the folds of the metal and projecting above them. These combined metal and glass or porcelain strips may be arranged to cross one another like a window-sash, leaving small spaces between them.

Screens or trays made in the above manner may be of any desired size, and may be provided with a suitable frame, sections of such a frame being shown in the drawings.

What I claim, and desire to secure by Letters Patent, is—

A drying-tray formed of a body having spaces for the passage of air, with which is combined glass or porcelain in small masses, arranged as described, so that the passage of air through the tray is permitted, and so that articles laid upon the tray for drying may rest upon the glass or porcelain, as and for the purpose described.

ALBERT D. CHASE.

Witnesses:
M. F. CLIFTON,
B. S. CLARK.